J. H. WOODGATE.
REVOLVING PULVERIZING HARROWS.
No. 195,198. Patented Sept. 11, 1877.
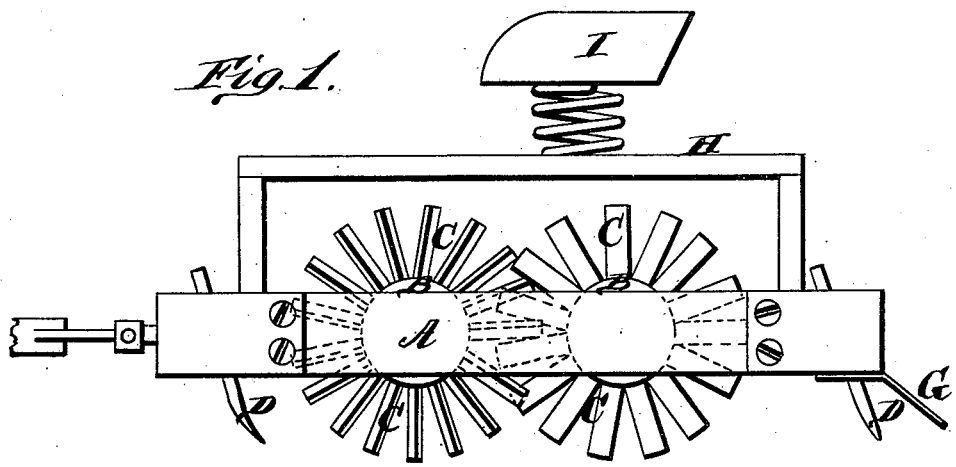
Fig. 1.
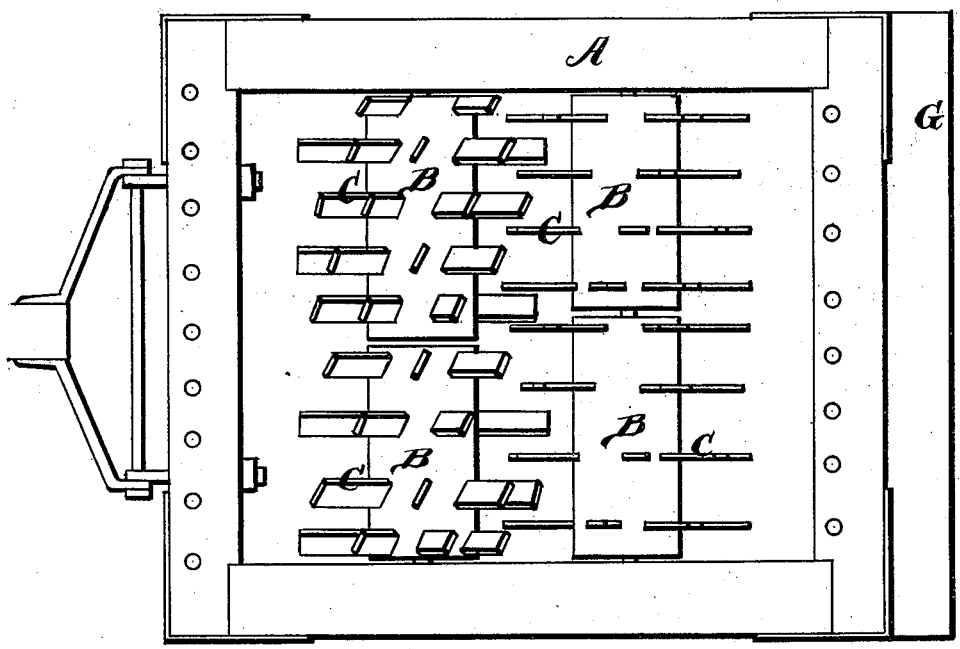
Fig. 2.
Fig. 3.  Fig. 4.
WITNESSES  
INVENTOR.  
James H. Woodgate  
ATTORNEYS.

UNITED STATES PATENT OFFICE.

JAMES H. WOODGATE, OF WAVELAND, INDIANA.

IMPROVEMENT IN REVOLVING PULVERIZING-HARROWS.

Specification forming part of Letters Patent No. 195,198, dated September 11, 1877; application filed July 21, 1877.

*To all whom it may concern:*

Be it known that I, JAMES H. WOODGATE, of Waveland, in the county of Montgomery and State of Indiana, have invented a new and valuable Improvement in Harrows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my harrow. Fig. 2 is a plan view, and Figs. 3 and 4 are details of the same.

The nature of my invention consists in the construction and arrangement of a revolving pulverizing-harrow, as will be hereinafter more fully set forth.

The annexed drawings, to which reference is made, fully illustrate my invention.

A represents a square or rectangular frame, of any suitable dimensions, within which are mounted four rollers, B, upon two parallel lines.

Each roller B is provided with a series of chisel-shaped teeth, C, set in spiral form around the roller.

The teeth in the front rollers are set obliquely to the line of draft, and those in the rear rollers are set parallel thereto, passing between the teeth of the front rollers, whereby the machine is enabled to clean itself, and thus prevent any clogging.

By this arrangement the faces of the teeth in the front roller strike the clods, and carry them against the edges of the teeth in the rear rollers, thereby thoroughly pulverizing the clods.

Each tooth C is formed with a screw-shank, C', which is screwed into the roller, and the way the teeth are set in the roller causes the pressure all the time to tighten the teeth, and thus obviating any liability of their becoming loose.

I also have two rows of rearwardly-curved and pointed teeth, D D, one row in front and the other in rear of the rollers. The upper ends or shanks of these teeth pass through the front and rear bars of the frame, and are held therein by any suitable means. These teeth, being inclined backward, tend to lessen the draft, and also assist in leveling the ground.

To the rear end of the frame is also attached a rigid metallic leveler, G, which extends in rear of the rear row of teeth D, to level or smooth the ground. This leveler is attached rigidly to the frame, and may be made of iron or wood, or both combined.

The rollers B B are covered with a housing, H, placed on the frame, and supporting the seat I.

What I claim as new, and desire to secure by Letters Patent, is—

1. The harrow-frame A, provided with rollers B, having teeth G arranged spirally thereon, the teeth on the front rollers having their faces oblique to the line of draft, and the teeth on the rear rollers having their faces parallel to the line of draft, and the teeth on the front and rear rollers breaking joints with each other, in combination with the front and rear rows of teeth D, curved backward, substantially as described, and for the purpose set forth.

2. The inclined rigid leveling-plate G, in combination with the frame A, having rollers B with teeth C, arranged as set forth, and the teeth D, curved backward, substantially as described, and for the purpose set forth.

In testimony that I claim the above I have hereunto subscribed my name in the presence of two witnesses.

JAMES HUMES WOODGATE.

Witnesses:
WILLIAM F. RHOADS,
JAMES C. WRIGHT.